United States Patent

[11] 3,603,721

| [72] | Inventors | Arem Foti;<br>Roy H. Albright, both of Greensburg, Pa. |
|---|---|---|
| [21] | Appl. No. | 9,525 |
| [22] | Filed | Feb. 9, 1970 |
| [45] | Patented | Sept. 7, 1971 |
| [73] | Assignee | I-T-E Imperial Corporation<br>Philadelphia, Pa. |

[54] INSULATOR COLUMN ARRANGEMENTS FOR A HIGH POWER ELECTRICAL DISTRIBUTION SYSTEM
9 Claims, 4 Drawing Figs.

[52] U.S. Cl.............................................. 174/141 R,
  174/150, 200/48 R
[51] Int. Cl................................................ H01b 17/48
[50] Field of Search............................................ 174/138 A,
  140 R, 141 R, 144, 148, 149 R, 149 B, 150; 200/48
  R, 148 R

[56] References Cited
UNITED STATES PATENTS
1,998,549   4/1935   Lapp et al....................   174/150 X FOREIGN PATENTS
975,503   11/1964   Great Britain................   174/150
348,124   5/1937    Italy..............................   174/141
395,224   12/1965   Switzerland..................   174/148

*Primary Examiner*—Laramie E. Askin
*Attorney*—Ostrolenk, Faber, Gerb and Soffen ABSTRACT: An arrangement for supporting electrical switches, buses and the like in a high power distribution system includes a first insulator column capacitively graded along its length so as to provide a substantially uniform voltage distribution from the energized switch or bus, etc., along the length of the column, and a second insulator column to provide the mechanical support for the electrical apparatus and for the first column. When so arranged, the two columns present an overall hourglass appearance and simultaneously exhibit desirable electrical and structural characteristics.

INVENTORS
AREM FOTI
ROY H. ALBRIGHT
BY
Ostrolenk, Faber, Gerb & Soffen
ATTORNEYS

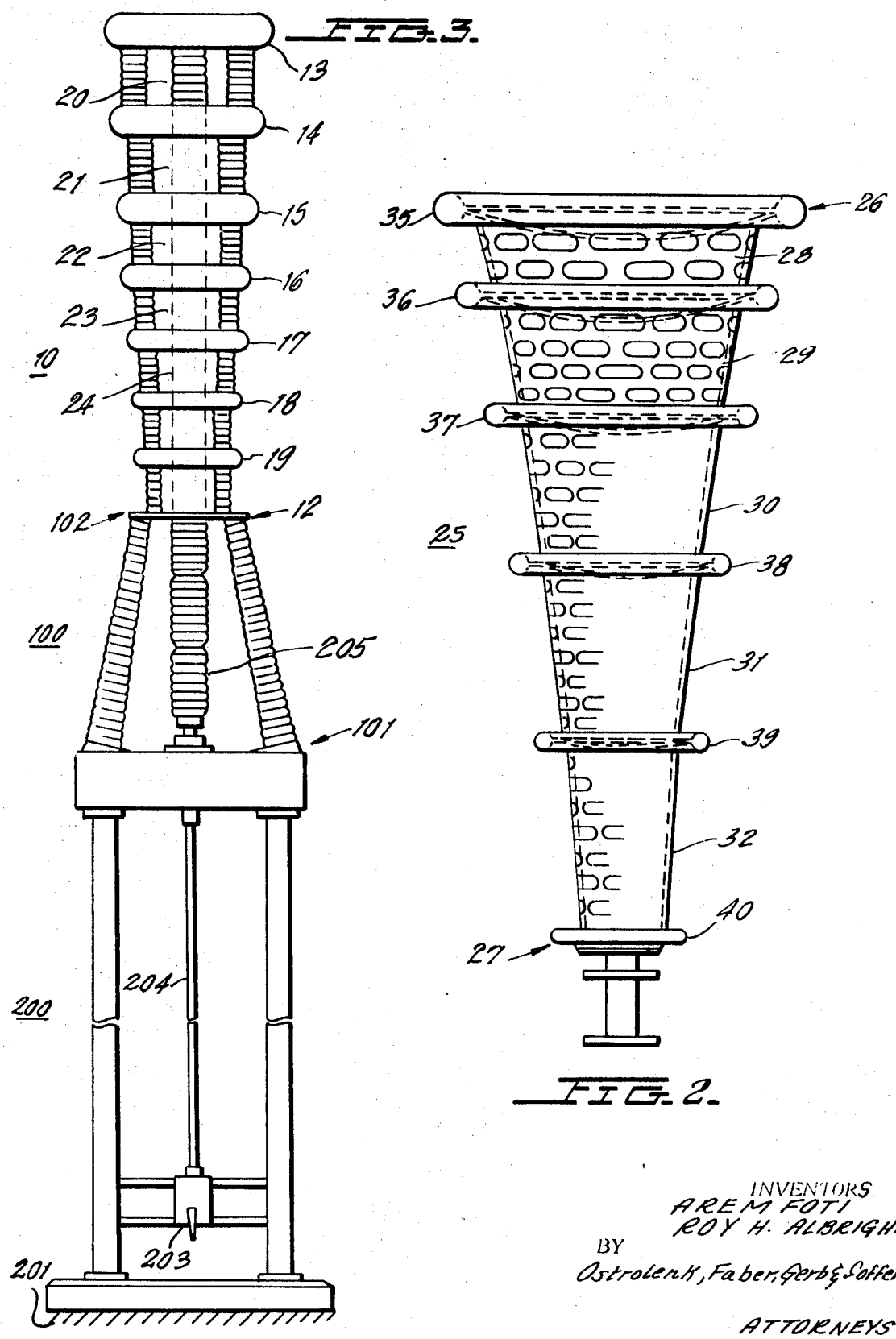

INSULATOR COLUMN ARRANGEMENTS FOR A HIGH POWER ELECTRICAL DISTRIBUTION SYSTEM

BACKGROUND OF THE INVENTION

This invention relates to electrical power transmission and distribution systems and, more particularly, to a novel arrangement for insulator columns employed therein.

With the growth of the electrical power industry, transmission voltages have increased from modest values of 5 to 15 kv. to the present high levels of 500 to 750 kv. As further growth in the industry occurs, it is anticipated that transmission voltages will extend to 1000 to 1500 kv. The formidable factor in the design of higher voltage systems is the provision for sufficiently high insulation strength.

During the period that the operating voltages have increased to their present level, the designs of insulator columns have been changed to improve their mechanical and electrical characteristics. In addition, the height of the insulator stacks have also been increased to meet the increased dielectric requirements necessitated by the higher operating voltages. However, increases in height have increasingly subjected the slender insulating columns to greater deflections at nominal loads. It will be readily apparent that increasing deflections of ever taller insulator columns (as might be expected with the higher 1000-1500 kv. voltages) are not without limit; limits may soon be reached if only to maintain the rigidity of the stack arrangement.

From a purely mechanical or structural standpoint, the preferred construction for an insulator column is one which is larger at the grounded bottom than at the top. This follows because the bending moments caused by the weight of the electrical equipment supported at the top, by wind, by snow and by ice become greater the more one moves away from the top fulcrum support. Unfortunately, this configuration is just the reverse of the arrangement which is the most desirable one from a purely electrical standpoint.

As is known, stray capacitance along the length of an insulator column is smaller near the top where the electrical apparatus is supported than it is at the bottom. To equalize the voltage gradient along the column, one might insert lumped capacitance along its length, by which increasing capacitance is added as one proceeds from the bottom of the column towards the top. Such increasing capacitance could be obtained by progressively widening the column in proceeding from bottom to top. Equalizing the voltage gradient in this manner would therefore be achieved at the cost of adversely affecting the mechanical stability of the insulator column.

It is thus an object of the present invention, to provide an insulator column arrangement for an electrical power distribution system which permits mechanical stability to be obtained while at the same time improves the electrical characteristics so as to effect substantially uniform voltage distribution along the length of the column from the support apparatus to the ground surface.

It is another object of the present invention to provide such insulator column arrangements which enable a substantial economy of space to be had.

It is a further object of the invention to provide insulator column supports of the type described having the ability to withstand electrical stresses associated with the continuously energized electrical distribution of 1000 to 1500 kv. under polluted conditions, when subjected to switching surges and when subjected to lightning impulse overvoltages.

It is yet another object of the invention to provide an insulator column arrangement exhibiting the aforesaid desirable mechanical and electrical features, while being relatively free of corona discharge and, consequently, relatively free of radio noise and television disturbance.

As will become clear hereinafter, insulator columns constructed in accordance with the present invention are of two types. One type serves as the support for the second type and is constructed to be larger at the bottom or base than at the top. This type serves to provide the mechanical stability for the large electrical apparatus required in the ultrahigh voltage environments of 1000 to 1500 kv. The second type supports the electrical switch, bus apparatus and the like, and uses capacitive grading by which the top of the column is wider than the bottom. This second column thus serves to produce the nearly uniform voltage distribution from the energized conductor toward ground. As will be readily apparent from the description that follows, an hourglass-type arrangement is provided which enables both the desirable electrical and mechanical characteristics to be obtained.

These and other objects of the invention will be more fully understood when considered with the following description in which:

FIG. 2 shows a second embodiment of such an insulator column according to the invention;

FIG. 3 shows the embodiment of FIG. 1 in conjunction with an insulator column providing mechanical support in an overall arrangement to provide a seemingly hourglass appearance.

DESCRIPTION OF THE INVENTION

Figure 1:
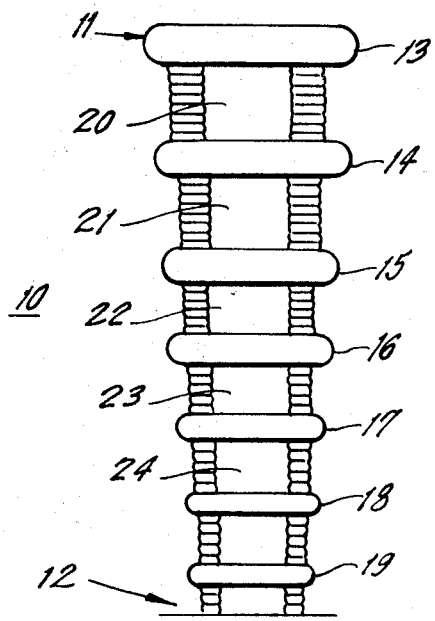
FIG. 1 shows a first embodiment of a capacitive graded insulator column constructed in accordance with the invention.

The capacitive graded insulator column 10 of FIG. 1 is particularly useful for electrical switch and bus support configurations in an energized electrical transmission and distribution system operating at voltages at, or in excess, of present 765 kv. It is believed that, in conjunction with the insulator column of FIG. 3, this insulator column 10 will prove highly attractive in expected systems of 1000 kv. to 1500 kv. capacity, and that the combined arrangement will be able to withstand the electrical stresses associated with such a continuously energized system under polluted conditions. It is also believed that such insulator column arrangements will be able to withstand similar electrical stresses present during switchover voltage conditions and, also, when the transmission system is subjected to lightning impulse voltages. Analysis of the design also gives the expectation that the insulator column arrangement will be relatively free of corona discharge and thus be removed from consideration as a possible source of radio noise or television disturbance.

In FIG. 1, a first embodiment of a capacitive graded insulator column is shown. This column 10 achieves a uniform voltage distribution from the top 11 of the insulator column down to its bottom 12 by using conventional insulator units between different size conducting rings 13, 14, 15, etc. to obtain the desired capacitive effect. These insulator units 20, 21, 22, etc. are typically comprised of porcelain material and, as an alternative to being interposed between metallic rings 13-15, etc., may be interposed between conductive epoxy rings, which in combination therewith also provides a capacitive effect. By employing larger diameter rings at the top 11 of the insulator column than are employed in progressing towards the bottom 12, greater capacity is exhibited near the top of the insulator, with the exhibited capacity decreasing towards the bottom. It will be seen that this capacitive graded insulator column is distinctly different from conventional pin and cap or station post insulator designs in present distribution equipment where no such tapering exists.

The capacitive grading for the insulator column of FIG. 1 is accomplished by a tapering of the diameter of the metal or conductive epoxy rings in proceeding from the top of the column 10 towards its bottom. Present plans envision the use of an overall insulator column arrangement of approximately 25 feet in height for use in a high voltage environment of 1000 kv. to 1500 kv. A capacitively graded insulator column as that in FIG. 1 may then be of the order of 15 feet in height; its diameter may be 7 feet at the top 11, tapering to a diameter of approximately 4 feet at the base 12. By having the larger metallic or conductive epoxy rings at the top 11, the greatest capacitance is exhibited in the region adjacent to the support for the electrical equipment, and nearly uniform voltage distribution is obtainable along the length of the column due to the decreasing capacitance from top to bottom.

With this substantially uniform voltage distribution, it will be appreciated that less tendency will exist for the surrounding air to be overstressed and to thereby cause corona discharge. As will become clear hereinafter, one particularly attractive design for the insulator column 10 of FIG. 1, is one in which the column itself is substantially hollow. The reason for this—and, also, for the hollow design of the insulator of the FIG. 2 embodiment—will be more fully appreciated from a discussion of the combined arrangement of FIG. 3.

In FIG. 2, a second-type of novel insulator column 25 for use at 1000 kv. to 1500 kv. is shown. This insulator column also employs the capacitive grading principle from top 26 to bottom 27 for achieving a uniform voltage distribution along the length of the column. Here, however, metal or conducting diaphragms 28, 29, 30, etc. are shown supported between layers of insulating material 35, 36, 37, etc., such as epoxy.

These conducting diaphragms 28–30, etc., serve as the electrodes of plate-type capacitors and are employed with cylindrically tapered epoxy sections 35–37, etc., which serve as the basic dielectric material in accomplishing a layer capacitive effect. As with the arrangement of FIG. 1, it will be seen that the diameters of the diaphragms and the diameters of the insulating sections are tapered so as to give decreasing capacitance from the top 26 of the insulator column 25 down to its base 27. This tapering—by means of which the top of the insulator column is wider than the bottom—again accomplishes the uniform voltage gradient. In one embodiment of this configuration, the tapered cylindrical sections 28–30, etc., were perforated to lessen windloading and to give greater leakage distance along the surface of the sections. The arrangement of FIG. 3 shows the insulator column of FIG. 1 mounted on an insulator support column 100 having a base 101 wider than its top potion 102. Such a column 100 provides good mechanical stability when heavy loads are being supported. This mechanical construction is, in turn, mounted on a frame 200 which rests on the ground surface 201. This arrangement may also include an operating mechanism 203 and connection 204 for rotating an insulator stack 205 passing through the columns 10 and 100 when hollow, to be used in opening and closing a switch supported atop the column 10 (not shown). The insulator column 100 in the previously referred to high voltage environment of 1000 kv. to 1500 kv. may be of the order of 10 feet in height; the support frame 200 may be an additional 30 feet high. The insulator column 100 can be made of porcelain material or, in a more expensive arrangement, can be made similar to the arrangement of the insulator column 10.

Figure 4:
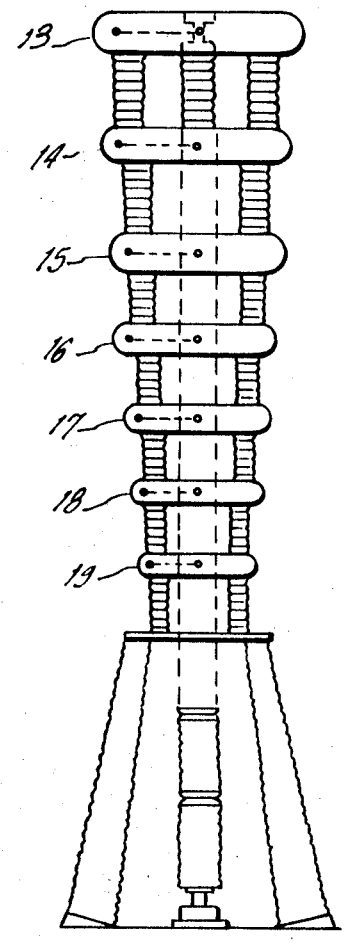
FIG. 4 shows a modification of the arrangement of FIG. 3.

The novel hourglass arrangement of this application is believed to make possible the building of electrical switch and bus equipment that must meet withstand voltages of 2000 kv. in designs that will be economical. By having the two types of insulator columns (10 or 25, and 100) substantially hollow as in FIG. 3, it is possible to have the rotating insulator stack 205 pass through the interior thereof. This provides not only for a substantial space saving, but more importantly, improves the capacitance distribution along the length of the upper insulator column 10 or 25. Also, this placing of the rotating insulator stack substantially in the center of the hollow column 10 permits the conducting rings of the configuration of Fig. 1 to be electrically connected to points on the stack 205 to substantially improve the grading of the voltage distribution. This uniformly voltage-graded insulator column 10 will then permit the insulators to withstand the ultrahigh voltage stresses in the best manner, yet without introducing difficulties with corona discharge. Such electrical connections to the rotating insulator stack 205 are schematically shown in FIG. 4.

While there has been described what is considered to be the preferred embodiment of the invention, it will be readily apparent that other modifications obvious to those skilled in the art are also possible. Thus, for example, the insulator column 100 of FIG. 3 may be used with the column 25 of FIG. 2 rather than with the insulator column 10 of FIG. 1 as shown. This configuration, however, will continue to give the seemingly hourglass appearance whereby capacitive grading is provided by the insulator column adjacent the energized electrical apparatus and mechanical support is provided by the insulator column remote therefrom.

We claim:

1. An arrangement for supporting electrical switches, buses, and like apparatus in a power distribution system comprising:
    upper and lower insulator column means arranged in a substantially hourglass configuration, with a first longitudinal extremity of said configuration supporting said electrical apparatus, and with a second longitudinal extremity mounted on a reference plane;
    said upper column having a plurality of metallic rings arranged at spaced intervals and a plurality of insulating means interspersed between said rings;
    said rings and said insulating means being of increasing width from the bottom of said upper column to the top thereof.

2. An arrangement for supporting electrical switches, buses, and like apparatus in a power distribution system comprising;
    a first insulator column supporting said electrical apparatus and providing a substantially uniform voltage distribution along the length of said column when said apparatus is energized:
    a second insulator column supporting said first column and said apparatus and mounted to provide mechanical stability for the overall construction; and
    said first and second insulator columns presenting an overall hourglass appearance;
    said first insulator column comprising insulating means and metallic means arranged in alternating fashion along the length of said first column so as to provide desirable electrical and structural characteristics.

3. The arrangement of claim 2 wherein the alternating metallic means and insulating means of said first insulator column are arranged to capacitively grade the first insulator column along its length to provide substantially uniform voltage distribution.

4. The arrangement of claim 3 wherein the insulator means and metallic means are tapered so that the diameters thereof are greater near the end of said first column adjacent to said supported electrical apparatus and so that the diameters thereof gradually decrease in progressing from said end toward that end of said column remote from said supported apparatus.

5. The arrangement of claim 3 wherein said metallic means comprise conductive diaphragms interposed between said insulating means and wherein said diaphragms and insulating means are tapered so that the diameters thereof are greater near the end of said first column adjacent to the said supported electrical apparatus and so that the diameters thereof gradually decrease in progressing from said end toward that end of said column remote from said supported apparatus.

6. The arrangement of claim 5 wherein said conducting diaphragms are perforated to lessen windloading.

7. The arrangement of claim 3 wherein said second insulator column is of greater diameter at the end remote from said supported first insulator column and wherein said second column has a diameter which gradually decreases in progressively along the length of said second column toward the end of said column adjacent said supported first column.

8. The arrangement of claim 3 wherein said first and second insulator columns have a hollow interior portion and wherein there is further included a rotatable insulator stack progressing therethrough along the length of said columns for controlling an electrical switch supported by said first column.

9. The arrangement of claim 8 wherein said second insulator column is mounted on a frame, and wherein there is further included operating mechanism means located at said frame for controlling the rotation of said stack to open and close said electrical switch.